United States Patent [19]

Saitoh et al.

[11] Patent Number: 5,585,319
[45] Date of Patent: Dec. 17, 1996

[54] PROCESS FOR PREPARING OIL SORBENT AND DEVICE FOR CONTINUOUSLY PREPARING THE SAME

[75] Inventors: Masaru Saitoh; Katsuo Umehara; Nobuya Minemura; Fumito Nakamura; Yukihiro Kato; Hiromu Endoh, all of Asahikawa, Japan

[73] Assignee: Hokkaido, Sapporo, Japan

[21] Appl. No.: 194,453

[22] Filed: Feb. 8, 1994

[30] Foreign Application Priority Data

Feb. 19, 1993 [JP] Japan .................................. 5-070672
Nov. 8, 1993 [JP] Japan .................................. 5-302287

[51] Int. Cl.⁶ .............................. B01J 20/00; B01J 21/04
[52] U.S. Cl. ............................................ 502/404; 502/439
[58] Field of Search .................................. 502/404, 439

[56] References Cited

U.S. PATENT DOCUMENTS

| | | |
|---|---|---|
| 3,770,575 | 11/1973 | Ball . |
| 4,065,347 | 12/1977 | Aberg et al. . |
| 4,343,680 | 8/1982 | Field et al. . |
| 5,039,651 | 8/1991 | Kosaka et al. ................ 502/424 |
| 5,110,785 | 5/1992 | Reed et al. . |
| 5,206,207 | 4/1993 | Tolles ........................... 502/424 |
| 5,324,703 | 6/1994 | McCue et al. ................. 502/424 |

FOREIGN PATENT DOCUMENTS

| | | |
|---|---|---|
| 2105631 | 4/1972 | France . |
| 2168085 | 8/1973 | France . |
| WO81/01575 | 6/1981 | WIPO . |

*Primary Examiner*—Anthony McFarlane
*Assistant Examiner*—Nhat D. Phan
*Attorney, Agent, or Firm*—Oblon, Spivak, McClelland, Maier & Neustadt, P.C.

[57] ABSTRACT

A process for preparing an oil sorbent excellent in oil sorptivity and water repellency and a device preparing the same are disclosed. The process for preparing an oil sorbent comprises mechanically fibrillating, or shredding and grinding lignocellulose material while substantially maintaining cell structure; and heating the resultant at a temperature of 250 to 450° C. or 350 to 400° C. for a predetermined period of time; followed by predetermined cooling to form an oil sorbent. The device for continuously preparing an oil sorbent having such a basic structure that three pipes with a "ellipse-shaped" cross-section each of which includes therein a screw type transferring means are arranged on top of one another, and the heating and the cooling are effected externally.

16 Claims, 7 Drawing Sheets

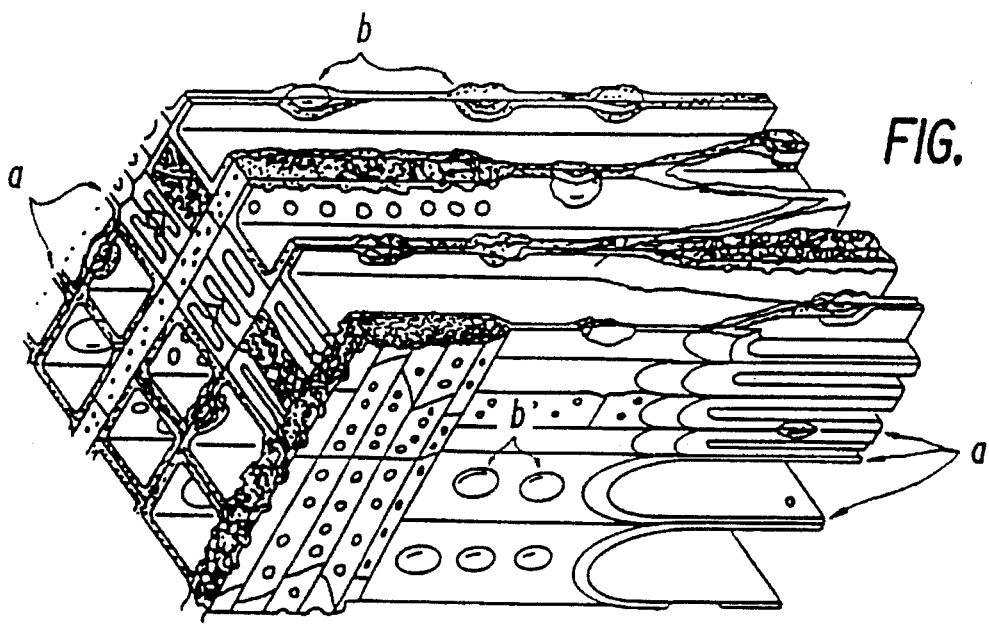
SCHEMATIC VIEW OF CELLS CONSTITUTING WOOD
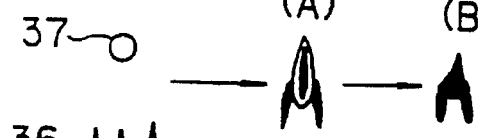
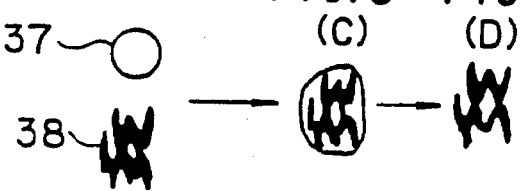
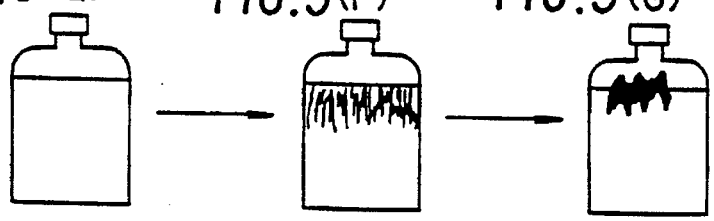

PROCESS FOR PREPARING OIL SORBENT AND DEVICE FOR CONTINUOUSLY PREPARING THE SAME

BACKGROUND OF THE INVENTION

1. Field of the Invention

The present invention relates to an oil sorbent made of fibrous ligno-material.

As seen from the Gulf War, stranding of an oil tanker and the like, marine pollution with an oil makes severe environmental disruption. Pollution due to an oil floating on or suspending in an industrial or domestic waste water also makes cumbersome problem. The present invention relates to an oil sorbent for efficiently adsorbing an oil which cause such pollutions.

2. Discussion of Background

With respect to collection and removal an oil floating on water therefrom, various methods are known, for example, a method which comprises pumping a mixture water with an oil, followed by emulsification with an emulsifier. Of these, a method which comprises causing a floating oil to be captured by means of an oil sorbent to effect collection and removal of the oil is the most simple and effective method.

Those used as such an oil sorbent for an oil floating on water are required to be good in hydrophobicity as well as in lipophilicity. As the material having such properties, synthetic resins such as a polypropylene and a polyurethane are widely used. As natural materials, there have been proposed one obtained by rendering a hydrophilic lignocellulose hydrophobic (Japanese Examined Patent Publication No.23702/1969), a ground wood piece having its surface sized with a paraffin wax (Japanese Examined Patent Publication No.15279/1979), one obtained by binding a polyvalent metal salt with a phosphoric acid-treated pulp and causing the polyvalent metal salt to be retained with a paraffin wax (Japanese Examined Patent Publication No.51386/1985), and a carbonized cellulosic fiber (Japanese Unexamined Patent Publication No.5893/1974). Further, since silky fibers of a seed of a kapok tree which grows in Southeast Asia (Java cotton)are highly hydrophobic and adequately lipophilic, Java cotton fixedly adhered to a polyethylene or polypropylene matrix is also known (Japanese Examined Patent Publication No.8033/1985).

Moreover, the applicant of the present application has previously filed a patent application relating to an oil sorbent which enables drawbacks inherent in such conventional inventions to be remedied (Japanese Patent Application No.70672/1993).

An oil sorbent for adsorbing an oil floating on water is required not only to have excellent adsorptivity as described above but also to be guaranteed in availability for its starting material, prepared in a simple manner, and excellent in disposal after being used. However, the above-mentioned conventional oil adsorbents using a synthetic resin such as a polypropylene or a polyurethane have problems in disposal after being used that a special incinerator is required when they are subjected to thermal disposal and, on the other hand, that they obstinately remain undecomposed if buried under the ground. On the other hand, with respect to the oil sorbent derived from natural materials such as one obtained by rendering a hydrophilic lignocellulose hydrophobic (Japanese Examined Patent Publication No.23702/1969), a ground wood piece having its surface sized with a paraffin wax (Japanese Examined Patent Publication No.15279/ 1979), and one obtained by binding a polyvalent metal salt with a phosphoric acid-treated pulp and causing the polyvalent metal salt to be retained with a paraffin wax (Japanese Examined Patent Publication No.51886/1985), there are the following problems. The natural materials per se are not effective as an oil sorbent and it is, therefore, necessary to intentionally impart water repellency thereto. If complicated treatment is required to impart water repellency, high costs are resulted therefrom. Further, when the natural materials are procured by import, stable availability for the starting material is not necessarily expectable.

In particular, it is described in the above-mentioned Japanese Unexamined Patent Publication No.5893/1974 that with respect to the oil sorbent disclosed therein which is a carbonized cellulosic fiber, addition of a reaction accerator such as $NH_4Br$ is effective in order to reduce a carbonization temperature. It is, however, described therein that the use of the reaction accerator involves disadvantageously strengthened water absorption properties of the resulting carbonized fiber ( see Japanese Unexamined Patent Publication No.5893/1974, column 3, line 5) and accordingly "use of a water repellant" is necessary to promote water repellency (see Japanese Unexamined Patent Publication No.5893/ 1974, column 5, line 18). Further, the cellulosic fiber of the invention disclosed therein means a regenerated cellulosic fiber such as a rayon staple, and a fiber of this type no longer has a hollow structure including a number of voids in the form of a natural fiber. The production of this oil sorbent has drawbacks that the step of regeneration of cellulose is required and yet treatment for imparting water repellency with a water repellant is troublesomely required, thereby leading to an increased cost.

With respect to an oil sorbent which is capable of eliminating the above-mentioned drawbacks inherent in such prior art techniques, the applicant of the present application has filed a patent application as Japanese Patent Application No.70672/1993. However, the "oil sorbent" according to this application has an unsolved problem that when it is allowed to float in water for a long period of time, its density gradually becomes high as it absorbs water and finally a portion of it sinks under the water surface. It goes without saying that as an oil sorbent used in a large extent of sea or the like, one capable of floating on water for a long period of time is practically preferred from the operational viewpoint. Further, to reduce production cost of an oil sorbent, a device is required which is capable of continuously producing the oil sorbent in a short time.

SUMMARY OF THE INVENTION

The present invention has been made to eliminate the above-mentioned problems. It is, therefore, an object of the present invention to provide an oil sorbent whose starting material is expectable in its stable availability and which is inexpensively prepared in a simple manner and yet which is excellent in terms of disposal. The oil sorbent according to the present invention is prepared by mechanically fibrillating, shredding or grinding lignocellulose material while substantially maintaining cell structure, and heating the resultant at a predetermined temperature for a predetermined period of time.

Thus, as a starting material for which stable availability is expectable, attention has been given to lignocellulose materials in which our country Japan is abundant. Lignocellulose materials widely occur in the fields of agriculture, forestry and forest products. Of these, various wastes resulted from various processing steps are readily available at low prices. In other words, wastes derived from forest products such as a waste paper, a wood flour, a bark and an odd fragment, and wastes derived from agricultural products such as a potato pulp and a beet pulp may be used as a starting material of the present invention.

An oil sorbent is required to be highly oil-adsorptive but not water-absorptive. To attain increased oil-adsorptivity, an oil sorbent is required to have a number of fine pores for retaining an oil. The present inventors have made intensive and extensive studies on means for forming fine pores as well as imparting water repellency, and as a result, they have found that it is effective to mechanically fibrillate, shred or grind the above-mentioned lignocellulose material while substantially maintaining cell structure so as to enable the above-mentioned fine pores to readily be formed, followed by heating of the resultant at a predetermined temperature for a predetermined period of time. Specifically, it was found that an oil sorbent with minimized water absorption and maximized oil adsorption is obtained by mechanically fibrillating, shredding or grinding a ligno-material into fibers by means of a pressure fibrillation device or the like, and heating the resultant at a temperature of 250° to 350° C., preferably 300° to 350° C. for a predetermined period of time. In this connection, as the heating time, a heating time of 20 to 100 minutes is most preferred. It is, however, practically sufficient to employ a heating time of 40 to 60 minutes.

In addition to the fact that when a lignocellulose material is subjected to the above-mentioned treatment, a heat-treated product having fine pores conducing to increased oil-adsorptivity is obtained, it was found that the form of the heat-treated product also contributes to the oil-adsorptivity. In other words, it was found that the form obtained by mechanically fibrillating, shredding or grinding lignocellulose material while substantially maintaining cell structure is contributory to increased oil adsorption. Intensive and extensive studies have been made on this point, and as a result, it was found that the oil-absorptivity becomes higher as bulk density (Although this is referred to as "bulk specific gravity" in the above-mentioned Japanese Patent Application No.70672/1993, these have the same meaning.) of the treated product becomes lower. It is extremely fit for this purpose to mechanically fibrillate, shred or grind a ligno-material as described above. When the bulk density (bulk specific gravity) is 0.01 to 0.2 g/cc, practically adequate oil adsorption can be attained. It was found that to obtain an oil sorbent having such a low bulk density, the reduction of the ligno-material to fibrous splits by the fibrillation or grinding prior to the heat treatment is better than reduction of the ligno-material to fibrous splits subsequently to the heat treatment.

The present inventors have further made the following intensive and extensive studies to eliminate the unsolved problem in the invention of the previously filed patent application (Japanese Patent Application No.70672/1993) and consequently to realize practically improved oil sorbent. The oil sorbent according to the invention of the previously filed patent application has high water repellency to such an extent that it floats on a water surface or a long period of time when allowed to float on the water surface. However, when it is allowed to float in water for a long period of time, its density gradually becomes high as it absorbs water and finally a portion of the oil sorbent prepared at a low temperature sinks under the water surface. The oil sorbent refloats on a water surface such as a sea surface after it has adsorbed an oil. However, it is practically preferred that the oil sorbent floats on a water surface also before it adsorbs an oil. When adsorption of an oil floating on a broad sea surface or the like is carried out, the heat-treated product is, for example, packed into a bag made of a non-woven fabric, wrapped up in a net, interposed between sheets or filled into a voided body having a honeycomb-like structure, and then scattered to cause the floating oil to be adsorbed, and then recollected. It is preferred from operational viewpoint that the treated product with oil adsorbed thereon floats on the water surface during the recollection.

Accordingly, intensive and extensive studies have been made on the above-mentioned treatment of the material to be heat-treated, and as a result, it was found that when the material is heated at a temperature of 250° to 450° C., water absorption is relatively small and oil adsorption is relatively large. Thence, the invention of the previously filed patent application has further been improved on, i.e., the above-mentioned lignocellulose material is mechanically fibrillated, shredded or ground, and then the resultant is heated at a temperature of 250° to 450° C. As described above, it is particularly preferred in order to attain optimum water repellency that the heating is conducted around 350° C.

With respect to the heating time, it was found that the heating time of 5 to 100 minutes is preferred, and of 5 to 60 minutes is more practically preferred in order to obtain such an oil sorbent as mentioned above which exhibits relatively small water absorption and relatively large oil adsorption. It is believed that when the temperature of the heat treatment is slightly raised, the bulk density of the resulting oil sorbent becomes high and hence yield of the oil sorbent becomes low. Therefore, to attain a certain performance, it is advantageous in terms of oil adsorption that the heat treatment is conducted at a lower temperature.

In addition, the form of the heat-treated product also contributes to the oil adsorption of such an oil sorbent having lipophilicity. Intensive and extensive studies have been made also on this point, and as a result, it was found that the oil adsorptivity becomes high as the bulk density becomes low. Thereupon, it was found that when the bulk density is adjusted to 0.01 to 0.03 g/cc by mechanically fibrillating, shredding or grinding lignocellulose material while substantially maintaining cell structure, practically satisfactory lipophilicity and consequent sufficient oil adsorption can be attained. In this connection, as mentioned above, the mechanical fibrillation, or shredding and grinding may be conducted subsequently to the heat treatment. It is, however, practically preferred that the mechanical fibrillation, or shredding and grinding be conducted to effect reduction to fibrous splits prior to the heat treatment so as to attain a bulk density in the above-mentioned range.

In addition, in the invention of the previously filed patent application (Japanese Patent Application No.70672/1993), because heat treatment is conducted by means of a rotary oven as described in Examples given hereinbelow, only about 100 g of an oil sorbent can be obtained per batch over a period of about 4 hours. Therefore, in order to produce the oil sorbent in a large amount, a device for continuously heating to produce the oil sorbent is required. Accordingly, a device has been developed which is capable of continuously conducting the treatment to produce the oil sorbent in a large amount.

The high adsorptivity exhibited by the oil sorbent according to the present invention is believed to be primarily attributable to the fact that cell structure comprising a tracheid, a vessel and the like which have large pores and small pits is substantially still present in the ligno-material.

In other words, it is believed that the treated product according to the present invention adsorbs an oil, water and the like because the oil, water and the like are captured in voids surrounded by walls of the tracheids to cause the adsorptivity to be exhibited. Next, the high oil adsorptivity, which is exhibited by reducing the starting material to fibrous or fine splits to effect the treatment of mechanical fibrillation, or shredding and grinding while substantially maintaining cell structure, and then heating the resultant at 250° to 450° C., is believed to be attributable to the following four functional factors, i.e., change in chemical structure of hydrophilic groups, formation of the pores, deposition of pyrolysates on the surface of the ligneous fibers, and retention of oil in intertwist among ligneous fibers. In other words, the fact that the lignocellulose material is hydrophilic is ascribable to the presence of hydroxyl groups in its structure, and by heat-treating the lignocellulose material as such, pyrolyric reaction of cellulose and the like is caused to occur, by which the hydroxyl groups is subjected to change to render hydrophilicity faded. By the pyrolytic reaction, various low molecular substances such as carbon monoxide and carbon dioxide are evolved off in the form of gas. After the gas evolution, pores formed thereby are left. The formation of the pores serves to enhance adsorptivity on various substances including oils as representatives. Further, the low bulk density enables adsorption by capillary action due to intertwist among ligneous fibers or fine splits to be facilitated.

BRIEF DESCRIPTION OF THE DRAWINGS

FIG. 2 is a schematic view of cells constituting a wood (a coniferous wood);

FIG. 3(A) is an illustration showing a state in which oil becomes in contact with fibers to cause the fibers to flocculate;

FIG. 3(B) is an illustration showing a state in which oil sorbed on the surfaces of fibers or interfaces between the fibers;

FIG. 3(C) is an illustration showing a state in which oil becomes in contact with intertwisted fibers to form a floc;

FIG. 3(D) is an illustration showing a state in which oil is sorbed on the surfaces of fibers or interfaces between the fibers;

FIG. 3(E) is an illustration showing a state in which water is contained in a polymer bottle;

FIG. 3(F) is an illustration showing a state in which oil sorbent is put into a bottle which has contained water, and then shaken;

FIG. 3(G) is an illustration showing a state in which oil is poured into the 3(F) state bottle and shaken, and consequently the oil is sorbed on the oil sorbent to form a floating floc;

DETAILED DESCRIPTION OF THE PREFERRED EMBODIMENTS

Figure 4:
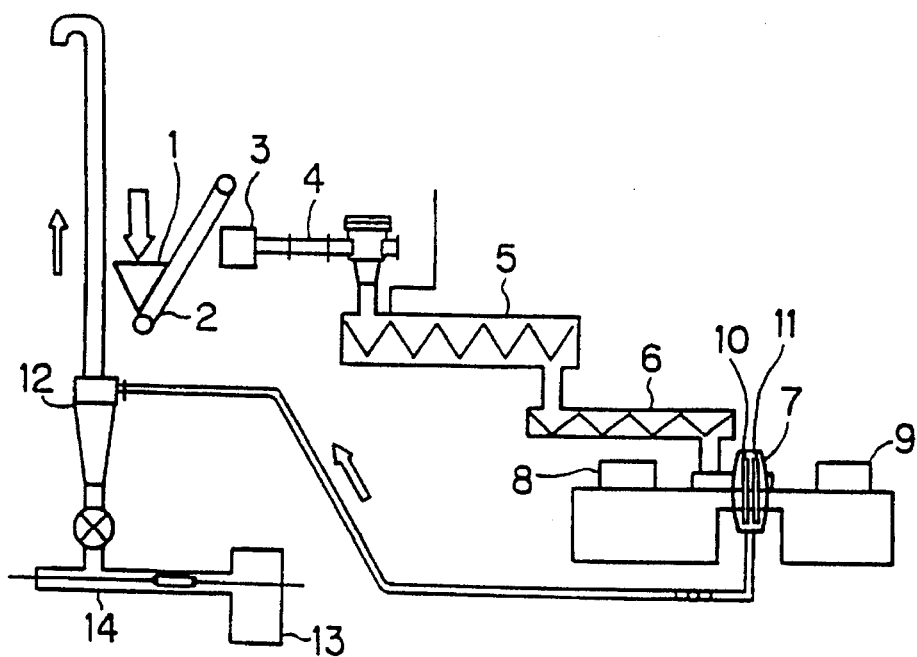
FIG. 4 is a diagrammatic view of a pressure fibrillating device.

Examples of the present invention will be described hereinbelow. In the present invention, the adsorption by the capillary action is recognized as being important, as described above. Therefore, the present invention is primarily characterized by mechanically fibrillating, shredding or grinding lignocellulose material into fibrous or fine splits while substantially maintaining cell structure. With respect to the todomatsu timber from thinning mentioned below, this step is mechanical fibrillation into fibers by means of a pressure fibrillating machine. A diagrammatic view of this pressure fibrillating machine is shown in FIG. 4. In FIG. 4, 1 represents an inlet for charging chips, 2 represents a conveyer which upwardly transfers the chips to a hopper 3, 4 represents a screw feeder for feeding the chips to a first pressure tube, 5 represents the first pressure tube for digesting the chips by blowing a steam at a predetermined temperature under predetermined pressure, 6 represents a second pressure tube for digesting the chips under the same pressure wherein chips are steamed to facilitate fibrillation, 7 represents a fibrillating machine comprising prime movers 8, 9 and discs 10,11 having spiral blades and respectively connected to the prime movers, and having its two discs 10,11 set with a predetermined clearance therebetween, said chips treated under pressure being fibrillated into fibers in the course of passing through the clearance between the rotating discs 10,11. The fibrillated fibers are in a wet state, and these are sucked and transferred to the front of a dryer 13 by means of a blow cyclone 12 and dried in the course of passing through a tube 14 by a heat-exchanged hot air from the dryer 13 to yield dried fibers. The above is an outline of the pressure fibrillating machine. Specifically, odd fragments resulted from sawing of todomatsu timbers from thinning were charged into a chipper, and the resulting tips were reduced to fibers (todomatsu fibers) by means of the above-described pressure fibrillating machine under pressure condition of 9 kgf/cm$^2$ of steam pressure (gauge pressure, temperature: about 179° C.) for one minute with the clearance set 0.8 mm. With respect to the thus obtained todomatsu fibers, bulk density was measured on occasion. The bulk density was determined in such a manner that fibers were caused to gently fall into a 1-liter vessel made of a polypropylene from above a 9-mesh screen while being disentangled with brush or the like until a level vesselful of fibers were accumulated and then the accumulated fibers were weighed, followed by calculation.

Figure 5:
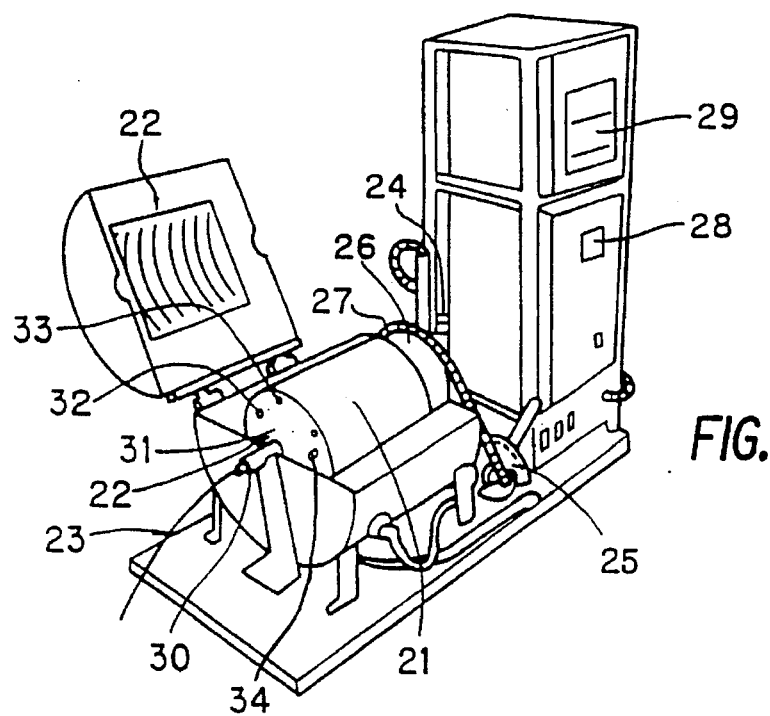
FIG. 5 is a diagrammatic view of a rotary oven.

In the next place, a rotary oven having the following outline was used in Examples to conduct the heating at a predetermined temperature. A diagrammatic view of the rotary oven is shown in FIG. 5. In FIG. 5, 21 represents a cylindrical heating vessel having a capacity of about 13,500 cm$^3$, 22 represents semicylindrical electric heaters each having a wattage of 2,770 for externally heating the heating vessel 21, which are hingedly openable, and 23 represents a temperature sensor for measuring the temperature in the heating vessel 21. Further, 24 represents a motor for rotating the heating vessel 21 at a predetermined numbers of revolutions via a chain 25, a gear 26 and a speed reducer 27, and in Examples, a 200-watt motor is used and the heating vessel 21 is rotated at 3 rpm. In the FIG., 28 represents a temperature controller for controlling the temperature in the heating vessel 21 on the basis of the results of the measurement by the temperature sensor 23, and 29 represents for recording the temperature measured by the temperature sensor 23. Further, the heating vessel 21 is provided with a cover 31 having a pipe 30 which permits escape of pyrolignous acid and pyrolignous gas. The cover 31 is adapted to be fixed by bolts 32, 33, 34 to enable the heat treatment to be conducted while maintaining such a condition that the air in the heating vessel 21 is expanded by the heating and entrains the pyrolysates through the pipe 30.

EXAMPLE 1

Odd fragments resulted from sawing of todomatsu timber from thinning are charged in a chipper, the resulting chips were mechanically fibrillated by means of the pressure fibrillating machine under pressure condition of 9 kgf/cm$^2$ of steam pressure (temperature: about 179° C.) for one minute with the clearance set 0.8 mm to form fibers (todomatsu fibers). The bulk density of this fibers was measured and found to be 0.012 g/cc with 8% of moisture content. The bulk density was determined using a 9-mesh screen in such a manner that fibers were caused to gently fall into a 1-liter vessel made of a polypropylene from above the screen while being disentangled with brush or the like until a level vesselful of fibers were accumulated and then the accumulated fibers were weighed, followed by calculation.

Then, the fibers were charged into the heating vessel 21 of the rotary oven shown in FIG. 5, and heated at 300° C. for 60 min with the cover 31 fixed and the heating vessel being rotated at 3 rpm, and then allowed to cool. Thereafter, the cover 31 was removed, and the contents were taken out to obtain a heat-treated product. In the step of heating, the internal air is expanded by the heating and caused to entrain the pyrolysates through the pipe 30 mounted on the cover 31, but external air does not flow into the heating vessel. The bulk density of the thus obtained heat-treated product was measured in the same manner as described above, and found to be 0.015 g/cc.

Figure 1A:
FIG. 1(A) is a photomicrograph showing intertwist of oil sorbent fibers.
Figure 1B:
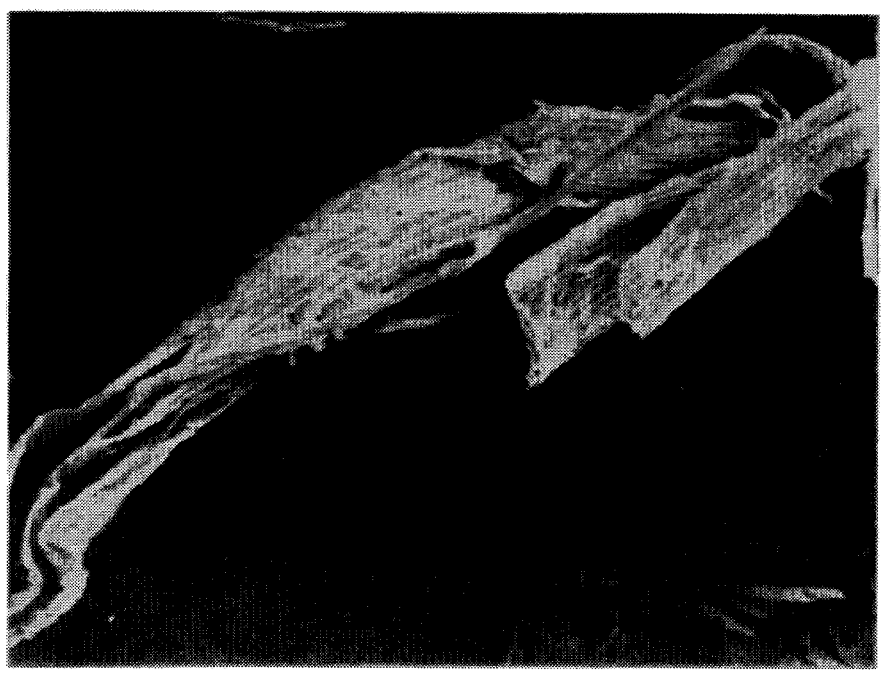
FIG. 1(B) is a photomicrograph showing a shape of a thick oil sorbent fiber.

FIG. 1 is photomicrographs of todomatsu fibers subjected to such heat treatment as described above. FIG. I(A) shows intertwist of the fibers, and the length of the white line in the bottom of the photograph corresponds to 0.1 mm. FIG. 1(B) shows thick one comprising a bundle of many tracheids, and the length of the white line in the bottom of the photograph corresponds to 1 mm. This may be schematized into such a schematic view as shown in FIG. 2. FIG. 2 is a schematic view of cells constituting a lignocellulose of a coniferous wood. The above-obtained heat-treated product exhibits high adsorptivity because of the presence of the cell structure as shown in FIG. 2. In FIG. 2, reference character "a" represents walls of tracheids and "b" represents pits. The treated product according to the present invention adsorbs oil, water and the like because of the fact that oil, water and the like are captured in voids surrounded by walls "a" of the tracheids or in intertwist among the fibers to cause the adsorptivity to be exhibited.

Then, the treated product is put into a bag made of a non-woven fabric and evaluated in accordance with the oil sorbent-related stipulation of Item 3, Paragraph 2, Article 33bis of Implementing Regulations of "Japanese Law Relating To Prevention Of Marine Pollution And Maritime Disaster". In other words, the criteria for performance test of oil sorbent in the criteria for performance test of drained oil scavenging materials in Item 52 of Ship Inspection applied mutatis mutandis to the test method. First, bags filled with the heat-treated product were allowed to float for 5 minutes on the surfaces of fuel oil A and fuel oil B each having a liquid temperature of 20° C., respectively. Thereafter, these were removed therefrom and allowed to stand on a wire netting for 5 minutes and then weighed. Empty bags as such were also subjected to the same treatment and weighed. Then, the measured values in the case of the bags per se were subtracted from the former measured values, respectively, and oil adsorptions per gram of the heat-treated product were calculated.

As a result, the adsorption with respect to fuel oil A was 25.0 g, and the adsorption with respect to fuel oil B was 38.5 g. In addition, water adsorption was determined in the same manner as above and found to be 0.01 g. In the above-mentioned implementing regulations, adsorptions per unit weight of an oil sorbent are prescribed to be "6 g or more" and "1.5 g or less" with respect to fuel oil B and water, respectively. The measured values adequately satisfied the prescribed values.

For comparison, adsorptions per unit weight with respect to a control which was not subjected to the heat-treatment were also determined in the same manner as above. As a result, adsorptions of fuel oil A, fuel oil B and water were found to be 15.0 g, 23.3 g and 19.2 g, respectively. The adsorption of water greatly exceeded the prescribed value, and the adsorptions of the oils were only about 60% of those on the heat-treated product. Manners are schematized into FIG. 3, in which oil, water and the like are captured by fibers having voids surrounded by walls of tracheids "a". In other words, FIG. 3 is a scheme showing manners of adsorption of oil on the oil sorbent according to the present invention.

In FIG. 3, 36 represents an oil sorbent comprising fibers, and 37 represents an oil to be adsorbed. When the oil sorbent consists of a single fiber 36, the oil 37 surrounds the fiber 36 upon contacting together to cause the state of FIG. 3(A), and the oil 37 is gradually adsorbed on the tracheids "a", which finally results in the state of FIG. 3(B). This is also true of the case where several fibers 36 are present but the fibers 36 intertwisted, oil adsorption is caused in the same manner. Next, in a case where the fibrous oil adsorbents 38 are intertwisted, manner of adsorption of the oil 37 on the intertwisted fibrous oil sorbent 38 is schematically shown. That is, the oil 37 is attracted to the intertwisted fibers 38 and immediately adsorbed on the fibers 38 as shown in FIG. 3(C), followed by the state of FIG. 3(D). In either state, when the amount of the oil is in excess of that of the fibers, the fibers are suspended in the oil.

It is also schematically shown how the oil adsorption occurs in a case where oil is poured into a bottle made of a polypropylene material which contains water. FIG. 3(E) shows a polymer bottle with water contained therein. FIG. 3(F) shows fibers individually floating under the surface of the water after an oil sorbent has been put into the polypropylene bottle and shaken. When an oil is poured therein and shaken again the fibers adsorb the oil and gather into a floc floating with its part above the surface of the water. This scheme schematically shows the manners of oil adsorption actually using the oil sorbent according to the present invention. This means that oil adsorption can readily be tried out by such a simple experiment.

EXAMPLE 2

Using commercially available shredded waste paper obtained by shredding newspaper and passing the resultant through a 6 mm-screen (NP-F, manufactured by Jujo Mokuzai K. K.), measurements were conducted in the same manner as above. Incidentally, this commercially available shredded waste paper had a bulk density of 0.038 g/cc prior to heating. The shredded waste paper was charged into the above-mentioned rotary oven and heated at 350° C. for 30 minutes while being rotated at 3 rpm. The resultant was allowed to cool to obtain a heat-treated product having a bulk density of 0.028 g/cc. Then, oil adsorption per gram thereof was determined in the same manner as in Example 1. As a result, adsorption of fuel oil A was 13.4 g, adsorption of fuel oil B was 19.6 g, and adsorption of water was 0.01 g. Both of the adsorption per unit weight of fuel oil and that of water adequately satisfied the prescribed values. In this connection, oil adsorptions on a control which was not subjected to the heat-treatment were 10.3 g with respect to fuel oil A and 15.0 g with respect to fuel oil B. These were only about 60% of those on the heat-treated product.

EXAMPLE 3

Figure 6:
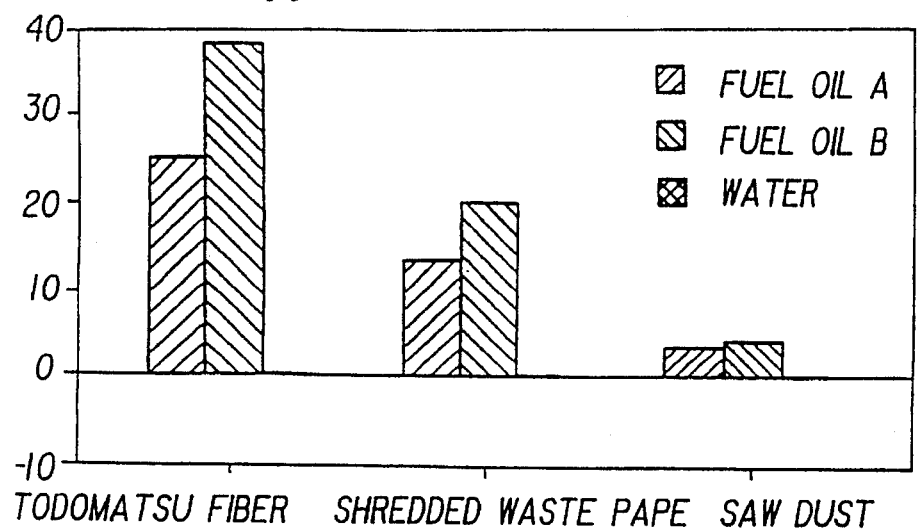
FIG. 6 is a graph showing differences among adsorptions quantity of fuel oil A, fuel oil B and water on various samples.

The same todomatsu fibers and shredded waste paper as the starting materials respectively used in Examples 1 and 2, and todomatsu saw dust were separately charged into the rotary oven and heated at 300° C. for 60 minutes, and the resultants were separately allowed to cool to obtain heat-treated products whose bulk densities were found to be 0.015, 0,028 and 0.149 g/cc, respectively. Then, with respect to each of the thus obtained heat-treated products, adsorptions of fuel oil A, fuel oil B and water were measured to obtain results as shown in FIG. 6. The ordinate axis represents each of oil adsorptions (g/g) of the heat-treated products. As is apparent from the results of the measurement in FIG. 6, the oil adsorptions per gram of the heat-treated products derived from the todomatsu fibers and the shredded waste paper were large. The water adsorptions were approximately 0 as shown in FIG. 6. As shown in the results of FIG. 6, it is understood that the lower the bulk density of the sample evaluated, the larger the oil adsorption per gram of the oil sorbent.

EXAMPLE 4

Figure 7:
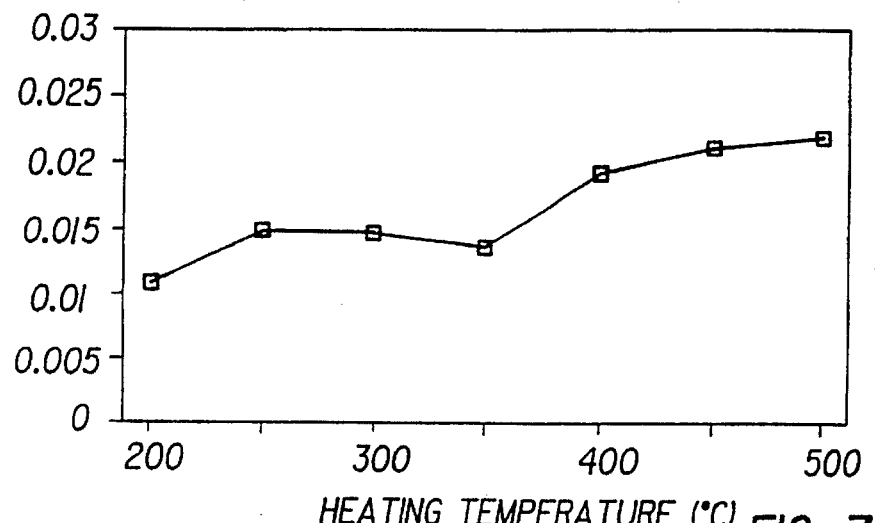
FIG. 7 is a graph showing relationship between the temperature of heat treatment and the bulk density of the todomatsu (Abies Sachalinsis Masters) fiber heat-treated product.

Next, it was examined that differences to what extent were caused in bulk density and yield depending upon change in the heating temperature. It was examined by charging the same todomatsu fibers as used in Example 1 into the rotary oven and heating the charge at each of temperatures of 200°, 250°, 300°, 350°, 400°, 450° and 500° C. for 60 minutes that changes to what extent were caused in bulk density and yield depending upon the heating temperature. After the heat treatment at each temperature, the resultant was allowed to cool to obtain a sample to be examined which has been heat-treated at each temperature, and bulk density of the sample was measured to obtain the results shown in FIG. 7. As is seen from FIG. 7, the bulk densities of the samples obtained by the heating temperatures on the order of 200° to 350° C. are on the order of 0.01 to 0.015 g/cc, while the bulk density becomes higher to about 0.025 g/cc as the heating temperature becomes higher.

Figure 8:
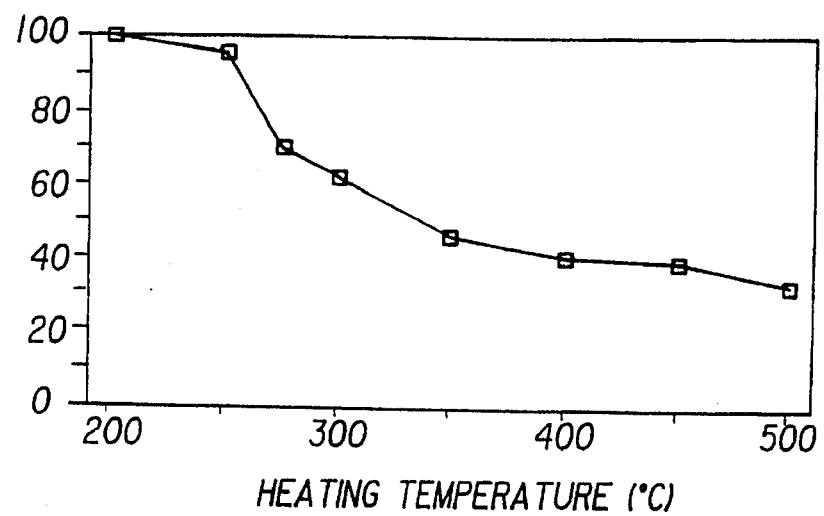
FIG. 8 is a graph showing relationship between the temperature of heat treatment and the yield of the todomatsu fiber heat-treated product.

Then, the same todomatsu fibers as above were heated in the rotary oven at each of temperatures of 200°, 250°, 300°, 350°, 400°, 450° and 500° C. for 60 minutes to determine each of yields of the treated products by the respective heating temperatures. This was conducted by measuring the weights of the treated products at respective temperatures relative to the weight of the starting material which was supposed to be 100, thereby determining the changes in yield were caused to what extent. By this measurement, the degrees of the pyrolysis of wood at respective temperatures are known. The results are shown in FIG. 8. As is seen from the results shown in FIG. 8, the bulk density becomes high and the yield becomes low as the temperature of the heat treatment becomes high.

Figure 9:
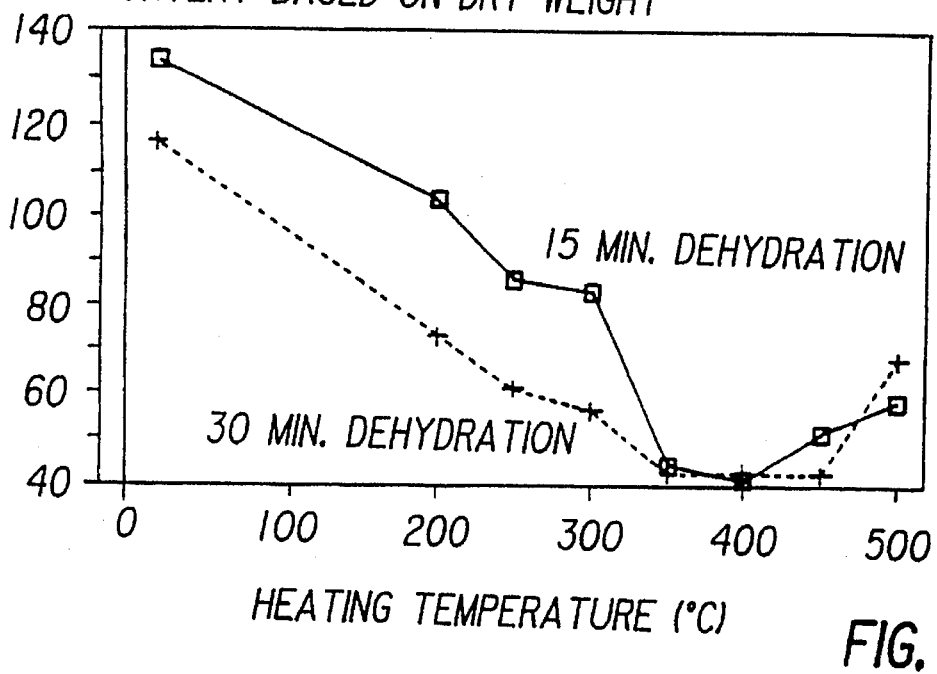
FIG. 9 is a graph showing relationships between the temperature of heat treatment and the moisture content of the todomatsu fiber heat-treated products which have been forced to adsorb water by shaking ten minutes per day for a week and then forcibly dehydrated.

Then, it was examined that differences in hydrophilicity and lipophilicity were caused to what extent depending upon change in the heating temperature. It was examined by charging todomatsu fibers into the rotary oven and heating the charge at each of temperatures of 200°, 250°, 300°, 350°, 400°, 450° and 500° C. for 60 minutes that changes in moisture content (%) based on dry weight and in oil adsorption (g/g) were caused to what extent depending upon the heating temperature. Each of the heat-treated products at respective temperatures was charged into a polypropylene bottle together with water, and forced to become in contact with water by shaking for ten minutes every day for a week. The results are shown in FIG. 9. As shown in FIG. 9, of the products treated at the respective temperatures which have been forced to become in contact with water, a week later, the entire or a part of those treated at a temperature of 200°, 250°, 300° and 500° C. sank to the bottom of the bottle, whereas those treated at a temperature of 350°, 400° and 450° C. did not sink at all.

Further, all the samples were dehydrated by means of a centrifugal separator at 550G (550 times of the gravity of the earth). The results are shown in FIG. 9. The moisture contents of those treated at a temperature of 350° to 450° C. were low, and therefore the oil adsorbents treated at a temperature in this range were confirmed to have very high water repellency.

Figure 10:
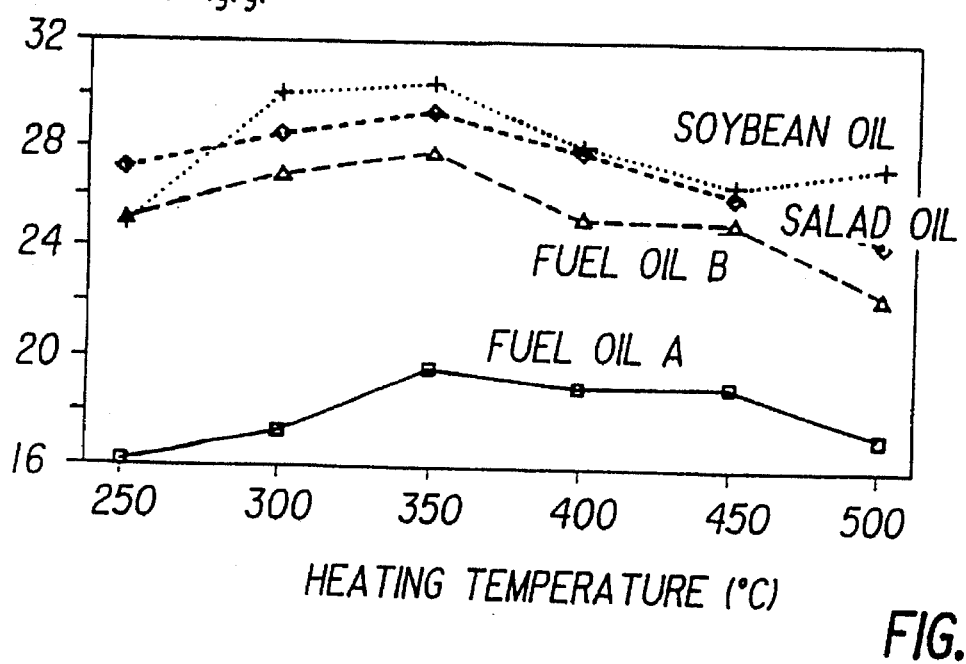
FIG. 10 is a graph showing relationships between the temperature of the heat treatment of the todomatsu fiber and oil adsorption with respect to various oils.

Then, it was examined that the above-mentioned products treated at a temperature of 250°, 300°, 350°, 400°, 450° and 500° C. were different to what extent in adsorptions of fuel oil A, fuel oil B, a salad oil, and a soybean oil. FIG. 10 shows respective adsorptions of the oils (g/g) according to each of the treating temperatures. As shown in FIG. 10, it is seen that although those treated at 350° C. exhibit the highest oil adsorptions, the treated products have excellent adsorptivity with respect not only to the mineral oils but also to vegetable oils when treated at a temperature in the range of 250° to 450° C.

From the above results, it is understood that the treated products according to the present invention are caused to have a lowered bulk density by the heat treatments at a temperature in the range of 250° to 450° C., optimally at 300° C. to result in oil adsorbents excellent in oil adsorption, and on the other hand, they are caused to exhibit extremely excellent water repellency by the heat treatments at a temperature around 350° to 400° C. to result in oil adsorbents which do not sink over a long period of time.

EXAMPLE 5

Then, the following experiment was conducted in order to ascertain the reason for the fact that the above-mentioned products treated at a temperature of 350°, 400° and 450° C. are particularly excellent in water repellency. Each of the todomatsu fibers heat-treated at a temperature of 350°, 400° and 450° C. which had been prepared in Example 4 was filled into a cylindrical and extracted with acetone for 72 hours using a Soxhlet's extractor. The resulting fibers were air-dried to remove acetone and then put into a polypropylene bottle together with water and shaken. As a result, the heat-treated product sank to the bottom of the polymer bottle within half a day. When this is considered in combination with the results of Example 4, it is presumed that each of the products heat-treated at a temperature of 350°, 400° and 450° C. had the inside of its voids derived from the basic structural form of the original cells, a portion of its surface and the like deposited with pyrolysates derived from the lignocellulose material per se during the step of the heat treatment, by which particularly excellent water repellency is imparted to each of the products.

Further, the same todomatsu fibers as used in Example 1 were charged into the rotary oven and heat-treated at each of temperatures of 350°, 400° and 450° C. while blowing nitrogen gas. Each of the resulting fibers were put into a polypropylene bottle together with water and shaken. As a result, the heat-treated product sank to the bottom of the polypropylene bottle within half a day. This indicates that by blowing nitrogen gas, substances imparting water repellency to each of the products heat-treated at a temperature of 350°, 400° and 450° C. were not formed, or the substances were not deposited on the inside of the above-mentioned voids or the surfaces of the cells, even if formed, and hence sufficient water repellency did not imparted.

To confirm this, the following additional experiment was carried out. These heat-treated products were exposed to an exhaust gas generated by heat-treatment as conducted in Example 1 (the temperature of the heat treatment: 350° C.). As a result, the resulting heat-treated products did not sink when shaken together with water. From this, it is assumed that substances responsible for imparting water repellency from the exhaust gas as in Example 1 were deposited on or acted on the heat-treated products to enable water repellent effect excellent as in Example 1 to be attained. With respect to Example 1, it is assumed that pyrolysates by the heating were generated during the heating and deposited on the surface of the substantially remaining cell structure during the heating or cooling to enable excellent water repellent effect to be attained.

Figure 11:
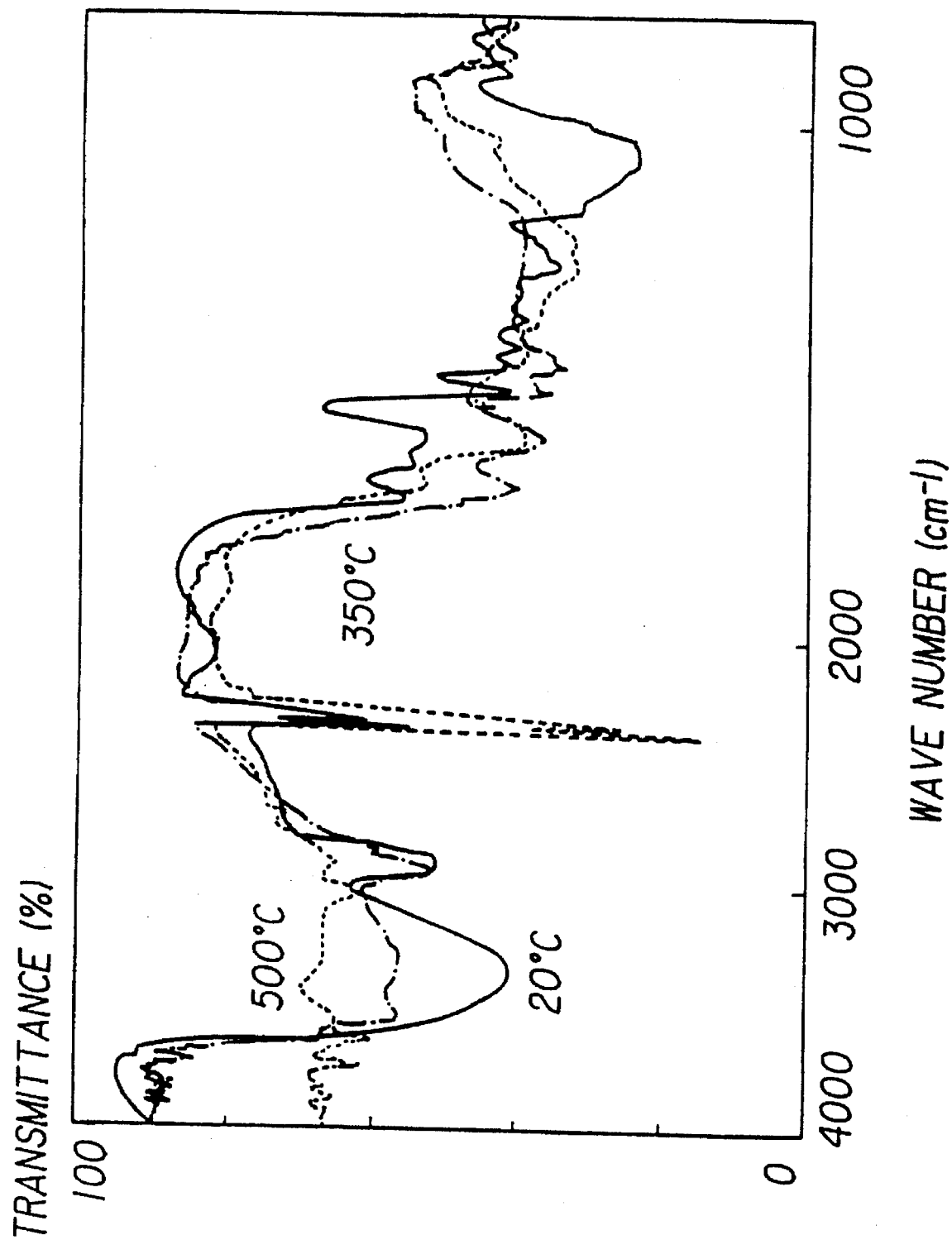
FIG. 11 shows FT-IR spectra todomatsu fibers treated at different temperatures.

This is evident from the following FT-IR spectroscopy. The FT-IR spectrum was obtained by mixing 5 mg of the sample and 95 mg of potassium bromide, putting the mixture in a sample vessel, and measuring reflected light 50 times, followed by Fourier transform. From the spectroscopy, it is observed that when the above-mentioned todomatsu fibers are heat-treated, pyrolyses of hemicellulose, cellulose and lignin in todomatsu sequentially begin to occur. As a result, pyrolysates are generated. This is apparent from the fact indicated by the FT-IR spectrum of FIG. 11 that both the absorptions at wavelengths of about 3,332 kayser and about 1,058 kayset are decreased, i.e., hydrogen bonds of hydroxyl groups near 3,332 kayser and monohydric alcoholic hydroxyl groups near 1,058 kayset are decreased. From this, it is understood that these hydroxyl groups underwent the changes by the pyrolyric reaction to fade hydrophilicity, thereby enabling water repellency to be promoted.

EXAMPLE 6

The same todomatsu fibers as used in Example 1 were charged into the rotary oven and heat-treated at a temperature of 325° C. for a period of 5 minutes and 20 minutes and at a temperature of 350° C. for a period of 5 minutes and 20 minutes while blowing nitrogen gas, and then allowed to cool. The heat-treated products had a bulk density of 0.018, 0.016, 0.017 and 0.017 g/cc and exhibited adsorption of fuel oil A of 24.5 g, 28.8 g, 27.4 g and 28.6 g, respectively. From this, it is understood that the oil adsorption is affected by the heating temperature more than the heating time.

EXAMPLE 7

Odd fragments resulted from sawing of latch timber from thinning were charged in a chipper, the resulting chips were mechanically fibrillated by means of the pressure fibrillating machine under pressure condition of 6 kgf/cm$^2$ of steam pressure (temperature: about 164° C.) for 5 minutes with the clearance set 2.0 mm to form fibers (latch fibers). The fibers were charged into the rotary oven at 350° C. and heated for 60 minutes and allowed to cool. Thereafter, the resultant was taken out to obtain heat-treated product having a bulk density of 0.025 g/cc. The heat-treated product was filled into a bag of a non-woven fabric as in Example 1, and measurement was conducted with a changed amount of 2.02 g, 3.41 g, 4.01 g and 6.00 g. As a result, adsorptions of fuel oil A were 10.56 g, 10.60 g, 9.12 g and 9.13 g, respectively. This means that adsorptions per gram were 5.2 g, 3.1 g, 2.3 g and 1.5 g, respectively, and it is accordingly understood that the most excellent oil adsorption is exhibited when the amount of the heat-treated larch fibers filled into the non-woven fabric bag of 10×10 cm is 2.2 g. When the oil adsorbents obtained in the above Examples 1 and 6 are practically used, it is preferred to select an appropriate form according to the place or purpose of use, for example, the oil adsorbents as such may be used, or alternatively, may be dispensed in a predetermined amount and then packed into a bag of a non-woven fabric, wrapped up in a net, interposed between sheets or filled into a voided body having a honeycomb-like structure for the use. To attain the appropriate form, the oil sorbent may be used in combination with a foaming material to increase bulk density.

EXAMPLE 8

Figure 12B:
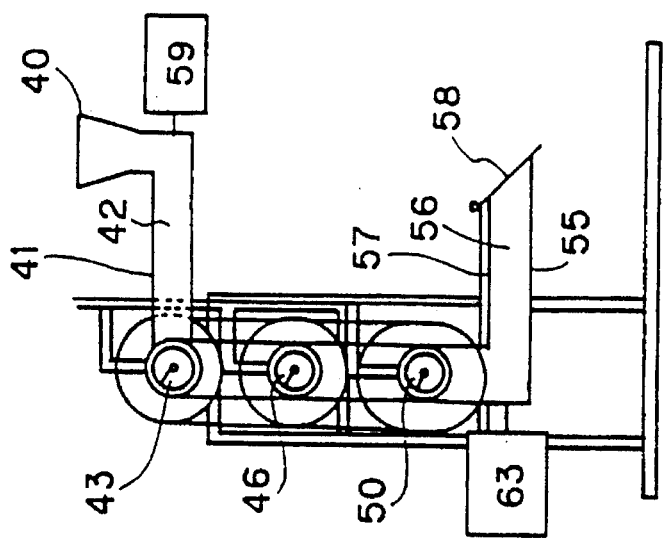
FIG. 12(B) is a diagrammatic side view of the same.
Figure 12A:
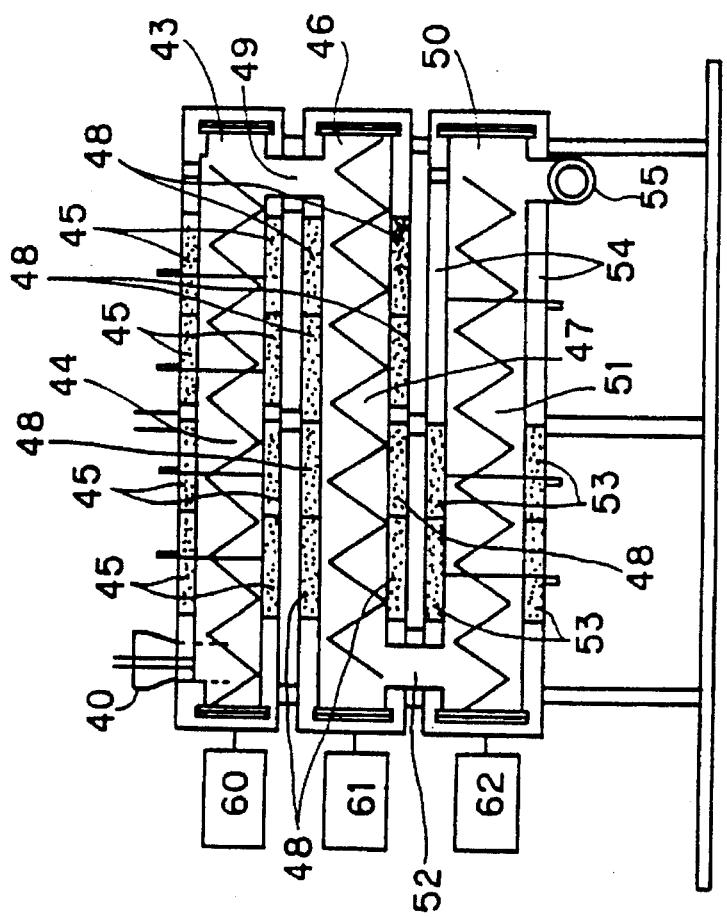
FIG. 12(A) is a diagrammatic front view of a screw continuous preparation device.

In the next place, study was made on a device for continuously preparing the oil sorbent. As a result, a screw continuous preparation device as shown in FIG. 12 was developed. As is apparent from FIG. 12, this continuous preparation device is characterized in that the device has a basic structure which comprises three "ellipse-shaped" pipes each having therein a screw for gradually advancing fibers under treatment forewardly and each prepared by longitudinally bisecting a stainless steel pipe of 30 cm in diameter and 300 cm in length and welding, to the bisected pieces, plates having the same thickness and disposed therebetween, the ellipse-shaped pipes being arranged on top of one another as top to bottom pipes and in communication with one another. FIG. 12(A) is a front view and FIG. 12(B) is a side view of the device. In the FIGS., 40 represents a hopper having an upside-down quadrangular pyramid shape with inlet opening 50 cm square, from which starting fibers are introduced. 41 represents a starting material forcing portion which comprises a pipe of 15 cm in diameter and 1 m in length having therein a screw 42 of 14 cm in diameter with its pitch stepwise changed from 15 cm to 5 cm sequentially, and which is so constructed as to capable of feeding the fibers into the top drying-preheating portion 43 while preventing air inflow. The drying-preheating portion 43 is a section to which fibers to be treated are fed from the starting material forcing portion 41 and in which the fibers are dried and preheated, and comprises a "ellipse-shaped" pipe prepared by longitudinally bisecting a stainless steel pipe of 30 cm in diameter and 300 cm in length and welding, to the bisected pieces, plates having the same thickness and disposed therebetween. In the ellipse-shaped pipe is provided a screw 44 of 29 cm in diameter and 20 cm in pitch, and on the outside of the ellipse-shaped pipe are mounted four 5 kw-electric heaters $45_1$–$45_4$. The drying-preheating portion 43 is therefore so constructed as to be capable of drying the fibers under treatment to remove moisture contained therein and preheating the fibers finally to 250° to 300° C.

46 represents the intermediate pipe which is a heating portion for effecting substantial heat treatment. The shape of the heating portion 46 and a screw 47 located therein have the same configurations as in the above-mentioned drying-preheating portion 43, and on the outside of the heating pipe 46 are mounted 5 kw-electric heaters $48_1$–$48_4$. The heating pipe 46 is so constructed that it has a communication pipe 49 at the end opposite to the starting material forcing portion 41, through which it is vertically in communication with the above-mentioned drying-preheating pipe 43, and that by rotations of the screw 44, the fibers under treatment are gradually fed into the heating pipe 46 through the communication pipe 49. Further, the heating pipe 46 is so constructed as to capable of changing the heating temperature in the range of 300° to 450° C. when the electric heaters $48_1$–$48_4$ are energized to effect the heating.

50 represents the bottom treatment portion and has the same structure as the drying-preheating portion 43 and the heating portion 45, and has also the same construction as the drying-preheating portion 43 and the heating portion 46 in terms of having therein a screw 51 of 29 cm in diameter and 20 cm in pitch. The treatment pipe 50 is so constructed that it is in communication with the heating pipe 46 by a communication pipe 52 at its end opposite to the communication pipe 49 for communication of the heating pipe 46 with drying-preheating pipe 43 to enable the fibers in the heating pipe 46 to be transferred into the treatment pipe 50. The treatment portion 50 functions as a section (high water repellency imparting section) into which pyrolysates generated in the heating portion 46 are transferred together with the fibers to cause the pyrolysates to be deposited on the surface or voids of the basic structural form of cells still remaining after the heat treatment of the fibers.

The treatment pipe 50 and the screw 51 have the same sizes and shapes as in the above-mentioned drying-preheating pipe 43. On the outside thereof, however, two 5 kw-electric heaters $53_1$–$53_2$ are provided over a range from the communication pipe 52 to the midway, while a water cooling jacket 54 for gradually cooling the fibers is provided over a range of the downstream half. 55 represents a cooling portion and comprises a pipe of 15 cm in diameter. Further, a screw 56 of 14 cm in diameter with its pitch stepwise changed from 15 cm to 5 cm sequentially is provided therein, and the fibers are advanced one after another preventing air inflow. The fibers are also cooled herein by the water cooling jacket 57 and then led to an outlet 58.

In the FIGS., each of 59, 60, 61, 62 and 63 is a 500 W-motor. Each of the motors 60, 61 and 62 is adapted to be capable of being changed to any intended advancing speed within a range of 0 to 20 rpm depending upon the order of the heating. On the other hand, each of the motors 59 and 63 is adapted to be capable of being changed to any intended advancing speed within a range of 0 to 40 rpm depending upon the conditions of feeding of the starting material and advance of the products. These are each made of a stainless steel.

In addition, for safety, a mechanism (not shown) is provided which is capable of blowing nitrogen gas at the beginning and the end of operation of the device, and the devise is so constructed that waste gas is cooled by a water cooling jacket (not shown) to condense pyrolignous acid and excess tar. Further, a safety valve is provided to prevent excessively raised pressure not shown when additional internal pressure is caused due to the waste gas and the like.

The oil sorbent according to the present invention is inexpensive and has extremely excellent oil adsorption effect, as compare with conventional oil sorbent. In particular, the oil sorbent according to the invention of the present patent application can be prepared using, as a starting material, ligneous wastes resulted from production steps of wooden products in a large amount or increasing waste paper whose disposal has recently been growing a great problem, thereby enabling great effect in terms of recycling or effective use of resources to be attained. Further, thinning indispensable for sound development of forest is not adequately carried out in practice, because decisive utilization of timbers therefrom has not been found out. In this respect, however, the oil sorbent according to the present invention enables profitable effect to be realized in that these timbers from thinning can effectively utilized.

The technique of the present invention resides in that wastes derived from lignocellulose materials such as a wood and the like can be converted into a useful oil sorbent by inexpensive and simple heat treatment. The obtained oil sorbent can readily be incinerated and is extremely readily disposable after use without problem, because its starting material is a natural organic substance. After all, the present invention greatly contributes not only to effective use of wastes but also to prevention of environmental pollution, which is very significant.

What is claimed is:

1. An oil sorbent produced by the process comprising the steps of:

fibrillating, shredding or grinding a lignocellulose material while substantially maintaining cell structure; and heating said lignocellulose at a temperature of 250° C. to 450° C. for 5 to 100 minutes, wherein said fibrillating, shredding or grinding produces fibers or fine splits of said lignocellulose material.

2. The oil sorbent of claim 1, wherein said heating is for 5 to 60 minutes.

3. The oil sorbent of claim 1, wherein said heating is at a temperature of 250° C. to 350° C.

4. The oil sorbent of claim 1, wherein said heating is at a temperature of 300° C. to 350° C.

5. The oil sorbent of claim 1, wherein said heating is at a temperature of 350° C. to 450° C.

6. The oil sorbent of claim 1, wherein said heating is at a temperature of 350° C. to 400° C.

7. The oil sorbent of claim 1, wherein said oil sorbent has a bulk density of from 0.01 to 0.2 g/cc.

8. The oil sorbent of claim 1, wherein said oil sorbent has a bulk density of from 0.01 to 0.03 g/cc.

9. The oil sorbent of claim 13, wherein a pyrolysate is deposited on a surface of said lignocellulose material during said heating.

10. The oil sorbent of claim 1, wherein a pyrolysate is deposited on a surface of said fibers or fine splits during said heating.

11. An oil sorbent comprising:

(a) fibers; and (b) a pyrolysate of lignocellulose, on said fibers, wherein said fibers have a cell structure substantially that of lignocellulose.

12. The oil sorbent of claim 11, wherein said oil sorbent has a bulk density of from 0.01 to 0.2 g/cc.

13. The oil sorbent of claim 11, wherein said oil sorbent has a bulk density of from 0.01 to 0.03 g/cc.

14. The oil sorbent of claim 11, wherein the oil sorbent does not sink in water after the oil sorbent has been in contact with the water in a bottle and shaken for ten minutes every day for a week.

15. The oil sorbent of claim 14, wherein said oil sorbent has a bulk density of from 0.01 to 0.2 g/cc.

16. The oil sorbent of claim 14, wherein said oil sorbent has a bulk density of from 0.01 to 0.03 g/cc.

\* \* \* \* \*